(12) United States Patent
Hartmann

(10) Patent No.: US 7,971,149 B2
(45) Date of Patent: Jun. 28, 2011

(54) METHOD FOR COMPARING AN ORIGINAL DOCUMENT AND A MODIFIED DOCUMENT USING USER-SELECTED REFERENCE POINT SETS

(75) Inventor: Brian Hartmann, Simi Valley, CA (US)

(73) Assignee: Bluebeam Software, Inc.

( * ) Notice: Subject to any disclaimer, the term of this patent is extended or adjusted under 35 U.S.C. 154(b) by 671 days.

(21) Appl. No.: 12/033,162

(22) Filed: Feb. 19, 2008

(65) Prior Publication Data
US 2009/0210818 A1 Aug. 20, 2009

(51) Int. Cl.
*G06F 15/00* (2006.01)
*G06F 13/00* (2006.01)
(52) U.S. Cl. ........................................ 715/763; 715/765
(58) Field of Classification Search .......... 715/711–715, 715/763–765, 749–751, 815, 760, 781, 800, 715/801, 851; 345/419, 420
See application file for complete search history.

(56) References Cited

U.S. PATENT DOCUMENTS 4,985,930 A * 1/1991 Takeda et al. ................. 382/306
7,433,103 B2 * 10/2008 Edge ............................. 358/518

* cited by examiner

*Primary Examiner* — Cao "Kevin" Nguyen
(74) *Attorney, Agent, or Firm* — Stetina Brunda Garred & Brucker

(57) ABSTRACT

A method for emphasizing differences between original and modified documents. The method includes displaying the original document with the original document defining an original document boundary and a first bitmap. The method includes displaying the modified document with the modified document defining a modified document boundary and a second bitmap. The method includes receiving a user-selected first reference point set including a plurality of reference points correlated to coordinates within the original document boundary. The method includes receiving a user-selected second reference point set including a plurality of reference points correlated to coordinates within the modified document boundary. The method includes transforming the first bitmap to a common reference using the first reference point set. The method includes transforming the second bitmap to the common reference using the second reference point set. The method includes comparing the bitmaps. The method includes displaying indicia related to the comparison of the bitmaps.

18 Claims, 14 Drawing Sheets

METHOD FOR COMPARING AN ORIGINAL DOCUMENT AND A MODIFIED DOCUMENT USING USER-SELECTED REFERENCE POINT SETS

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present invention relates generally to methods for electronic document revision tracking and control. More particularly, the present invention relates to a method for calibrating a modified document and an original document for difference identification.

2. Related Art

Advancements in high speed data communications and computing capabilities have increased the use of remote collaboration for conducting business. While real-time collaboration using videoconferencing and the like are gaining popularity, the vast majority of collaboration occurs over e-mail in the exchange documents incorporating incremental modifications, comments, and the like. A local user may create an initial version of a document, and transmit the same to remotely located colleagues. These remote users may then make their own changes or add comments in the form of annotations appended to the document, and then transmit the new version back to the local user.

Such collaboration may involve the exchange of documents generated with word processing applications, desktop publishing applications, illustration/graphical image manipulation applications, Computer Aided Design (CAD) applications, and so forth. As utilized herein, the term "document" may refer to data produced by any of the aforementioned software applications. Furthermore, the term "content" may refer to data particular to the software application that generated it and stored in the document of the same. Due to the existence of many different computing platforms having a wide variety of operating systems, application programs, and processing and graphic display capabilities, it has been recognized by those in the art that a device-independent, resolution-independent file format was necessary to facilitate such exchange. In response to this need, the Portable Document Format (PDF), amongst other competing formats, has been developed.

The PDF standard is a combination of a number of technologies, including a simplified PostScript interpreter subsystem, a font embedding subsystem, and a storage subsystem. As those in the art will recognize, PostScript is a page description language for generating the layout and the graphics of a document. Further, per the requirements of the PDF storage subsystem, all elements of the document, including text, vector graphics, and raster (bitmap) graphics, collectively referred to herein as graphic elements, are encapsulated into a single file. The graphic elements are not encoded to a specific operating system, software application, or hardware, but are designed to be rendered in the same manner regardless of the specificities relating to the system writing or reading such data. The cross-platform capability of PDF aided in its widespread adoption, and is now a de facto document exchange standard. Currently, PDF is utilized to encode a wide variety of document types, including those composed largely of text, and those composed largely of vector and raster graphics. Due to its versatility and universality, files in the PDF format are often preferred over more particularized file formats of specific applications. As such, documents are frequently converted to the PDF format.

The exchange of documents according to the workflow described above may take place numerous times, with the content of the document evolving over time. For example, in various engineering projects utilizing CAD drawings such as in architecture or product design, a first revision of the document may include only a basic outline or schematic. Subsequent revisions may be generated for review and approval as further features or details are added prior to construction or production. On a more extended timeline, multiple iterations of designs may be produced. In another example, an author or a graphics designer may produce an initial draft of a document, with editors and reviewers adding comments or otherwise marking the document and resubmitting it to the author or graphics designer. The changes are incorporated into a subsequent version. While in some instances the review and approval process is performed directly on the electronic document, there are many instances where a printed hard copy of the document is utilized. As such, the reviewer may annotate, comment upon, edit, or otherwise supplement with information directly upon the hard copy of the document.

When it is necessary to send the printed copy of the document to another electronically, a scanner is typically utilized to capture the document. More particularly, the scanner converts an "analog" image, which consists of continuous features such as lines and areas of color, to a digitized encoding that represents the analog image. A rasterized image, or a bitmap, is generated comprising rows and columns of pixels, with each pixel representing one point in the image. Separately viewed, the pixel does not convey useful visual information, but when the entire field of pixels is viewed at an appropriate distance, a facsimile of the analog image can be recognized. As is generally known, each pixel is represented by luminance strengths of primary colors. Digital representation typically uses the RGB (Red Green Blue) color space, while print typically uses the CMYK (Cyan, Magenta, Yellow, Black) color space.

In acquiring the digital image, some distortion with respect to scale and rotation may be introduced. A correction filter may be applied to the data, though this can correct distortions only to a certain degree. Additionally, correction filters may also attempt to correct distortions introduced during the analog-to-digital conversion process. Due to the existence of numerous other variables that affect the capture and conversion of images, acquiring an exact digital replica of the printed copy is difficult.

During collaboration, it is often desirable to review earlier versions of a document and comparing the same to a current version of the document. By doing so, the evolution of the content may be better appreciated, and each change made to the content may be tracked for approval and other purposes. Various techniques exist for emphasizing differences, but each such technique requires that the two documents being compared be properly aligned. Otherwise, unchanged portions of the document may be identified as being different, when it is only pixel noise, rotation, scale, offset or other like distortion that is different. Where one version of the document is generated directly from the application and another version of the document is scanned from a printed copy, either or both of the documents may be distorted.

Accordingly, there is a need in the art for a method for aligning a modified document and an original document where such documents are being compared to accentuate differences therebetween.

BRIEF SUMMARY

According to an aspect of the present invention, there is a method for emphasizing differences between an original document and a modified document. The method includes displaying the original document upon a display monitor, the original document defining an original document boundary and a first bitmap. The method includes displaying the modified document upon a display monitor with the modified document defining a modified document boundary and a second bitmap. The method includes receiving a user-selected first reference point set including a plurality of reference points correlated to coordinates within the original document boundary. The method includes receiving a user-selected second reference point set including a plurality of reference points correlated to coordinates within the modified document boundary. The method includes transforming the first bitmap to a common reference using the first reference point set. The method includes transforming the second bitmap to the common reference using the second reference point set. The method includes comparing the first and second bitmaps. The method includes displaying indicia upon the display monitor related to the comparison of the first and second bitmaps.

According to various embodiments, the indicia may be superimposed with a display of the original document at locations corresponding to differences between the original and modified document. The first and second bitmaps may each be defined by a plurality of pixels arranged in ordered rows and columns with each of the pixels having pixel coordinates associated therewith. The receiving of the user-selected first reference point set may be through the use of a computer mouse. The receiving of the user-selected second reference point set may include superimposing a guide data point set with a display of the modified document, the guide data point set is representative of the first reference point set. The receiving of the user-selected second reference point set may include rotating the guide data point set relative to the display of the modified document. The receiving of the user-selected second reference point set may include superimposing a ghost image with a display of the modified document, the ghost image is representative of a portion of the original document adjacent to the first reference point set. The receiving of the user-selected second reference point set may include rotating the guide data point set relative to the display of the modified document. The receiving of the user-selected second reference point set may include aligning the ghost image with a corresponding portion of the modified document. The first reference point set may define a first region, and the second reference point set may define a second region, the comparison of the first and second bitmaps includes comparing only portions of the first and second bitmaps corresponding to the first and second regions.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

Common reference numerals are used throughout the drawings and the detailed description to indicate the same elements.

DETAILED DESCRIPTION

The detailed description set forth below in connection with the appended drawings is intended as a description of the presently preferred embodiment of the invention, and is not intended to represent the only form in which the present invention may be constructed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first and second, and the like are used solely to distinguish one from another entity without necessarily requiring or implying any actual such relationship or order between such entities.

Figure 1:
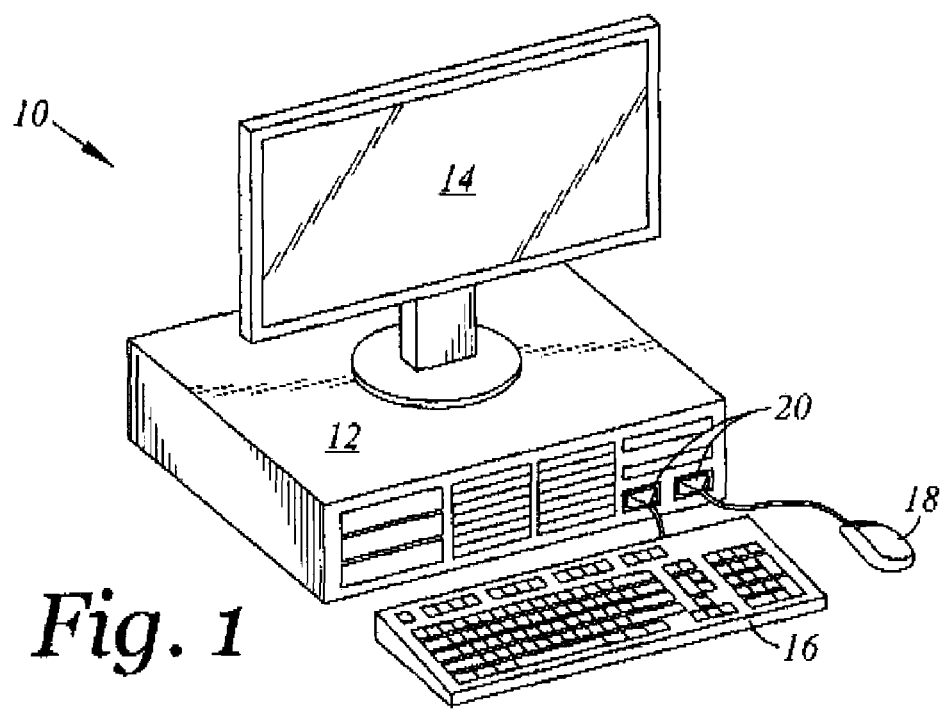
FIG. 1 is a perspective view of an exemplary computer system that may be capable to perform functions for use with aspects of the present invention including a display monitor.

With reference to FIG. 1, an exemplary hardware environment in which aspects of the present invention may be implemented includes a computer system 10 with a system unit 12 and a display monitor 14. The display monitor 14 graphically displays output from the data processing operations performed by the system unit 12. The display monitor 14 is a visual output device and includes some form of screen. The display monitor 14 may be of a Liquid Crystal Display (LCD) type, a Cathode Ray Tube (CRT) type, or any other suitable type of display. Devices such as a keyboard 16 and a mouse 18 provide input to the data processing operations, and are connected to the system unit 12 via a USB port 20. Various other input and output devices may be connected to the system unit 12, and alternative interconnection modalities may be substituted with the USB port 20.

Figure 2:
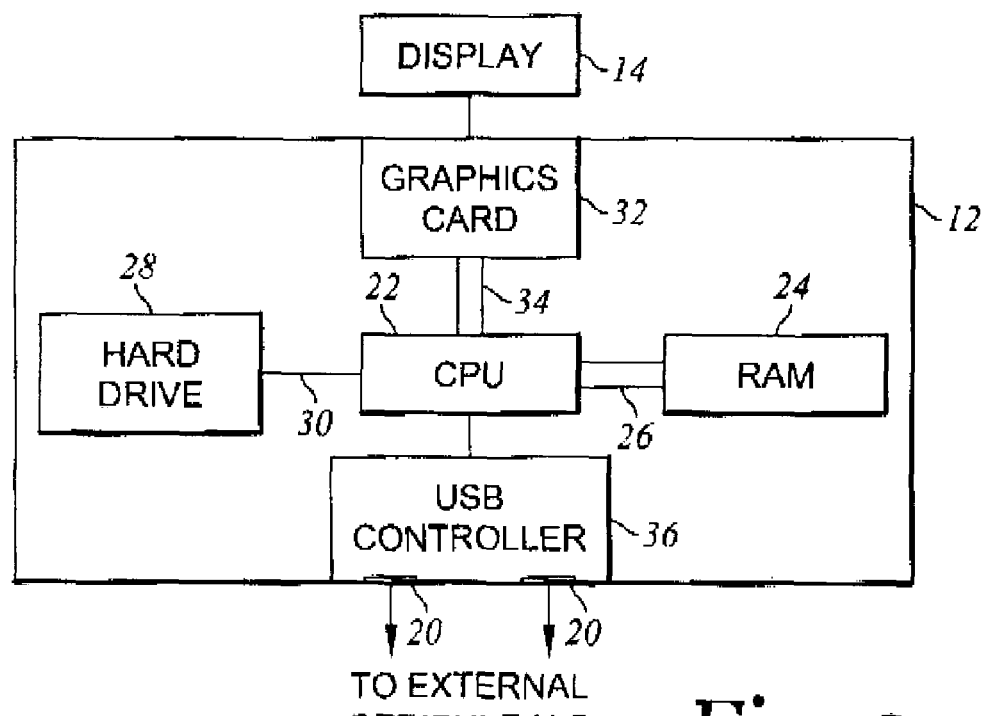
FIG. 2 is a block diagram of system components of the exemplary computer system of FIG. 1.

As shown in the block diagram of FIG. 2, the system unit 12 includes a Central Processing Unit (CPU) 22, which may represent one or more conventional types of such processors, such as an IBM PowerPC, Intel Pentium (x86) processors, and so forth. A Random Access Memory (RAM) 24 temporarily stores results of the data processing operations performed by the CPU 22, and is interconnected thereto typically via a dedicated memory channel 26. The system unit 10 may also include permanent storage devices such as a hard drive 28, which are also in communication with the CPU 22 over an i/o bus 30. Other types of storage devices such as tape drives, Compact Disc drives, and the like may also be connected. A graphics card 32 is also connected to the CPU 22 via a video bus 34, and transmits signals representative of display data to the display monitor 14. As indicated above, the keyboard 16 and the mouse 18 are connected to the system unit 12 over the USB port 20. A USB controller 36 translates data and instructions to and from the CPU 22 for external peripherals connected to the USB port 20. Additional devices such as printers, microphones, speakers, and the like may be connected to the system unit 12.

The system unit 12 may utilize any operating system having a graphical user interface (GUI), such as WINDOWS from Microsoft Corporation of Redmond, Wash., MAC OS from Apple, Inc. of Cupertino, Calif., various versions of UNIX with the X-Windows windowing system, and so forth. The system unit 12 executes one or more computer programs, with the results thereof being displayed on the display monitor 14. Generally, the operating system and the computer programs are tangibly embodied in a computer-readable medium, e.g. one or more of the fixed and/or removable data storage devices including the hard drive 28. Both the operating system and the computer programs may be loaded from the aforementioned data storage devices into the RAM 24 for execution by the CPU 22. The computer programs may comprise instructions which, when read and executed by the CPU 22, cause the same to perform the steps to execute the steps or features of the present invention.

The foregoing computer system 10 represents only one exemplary apparatus suitable for implementing aspects of the present invention. As such, the computer system 10 may have many different configurations and architectures. Any such configuration or architecture may be readily substituted without departing from the scope of the present invention.

Figure 3:
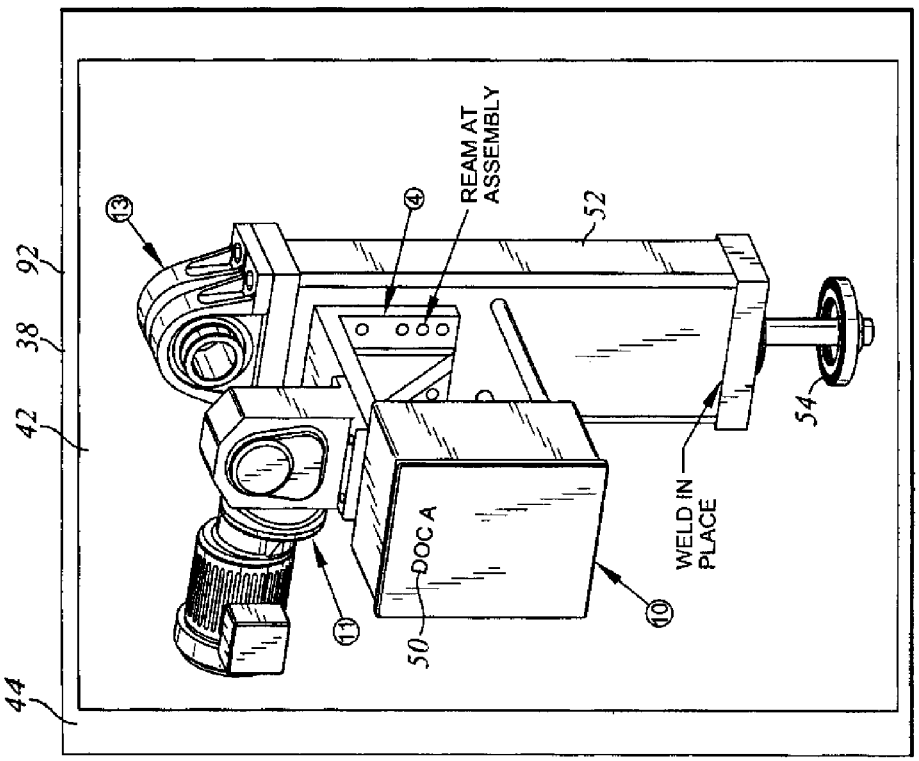
FIG. 3 is a plan view of exemplary original document.

Referring now to FIG. 3, there is depicted an exemplary original document 38. The original document 38 may be graphically represented via the computer system 10. The original document 38 is symbolic in nature and represents any document or computer file that may be displayed at a graphic user interface such as the display monitor 14. The original document 38 may be based upon graphic, drawing, data, or word processing files for example, and may be stored in any number of formats in computer memory, such as in the hard drive 28 and/or RAM 24. Additionally referring now to FIG. 4, there is depicted an exemplary modified document 40 that may also be graphically represented via the computer system 10 and displayed at a graphic user interface such as the display monitor 14. It is contemplated that the original and the modified documents 38, 40 may be versions or drafts of a same document or versions or drafts derived from a common or similar documents or even completely different documents with completely different content and or formatting. Moreover, while the original and modified documents 38, 40 of the embodiment depicted have the same document dimensions, the document dimensions may be different as well.

According to an embodiment, the original and modified documents 38, 40 are PDF files, with its contents being stored as discrete objects of text, geometric primitives, or blocks of raster images. If the modified document 40 was digitized from a hard copy, while the entire image is likely to be a raster image, the image itself will be encapsulated as an object within the PDF file. According to such an embodiment, the original document 38 may be converted to a first bitmap, and the modified document 40 is converted to a second bitmap. However, it is understood that the original and modified documents 38, 40 may already exist as bitmaps. In such a case, the conversion is omitted.

Figure 4:
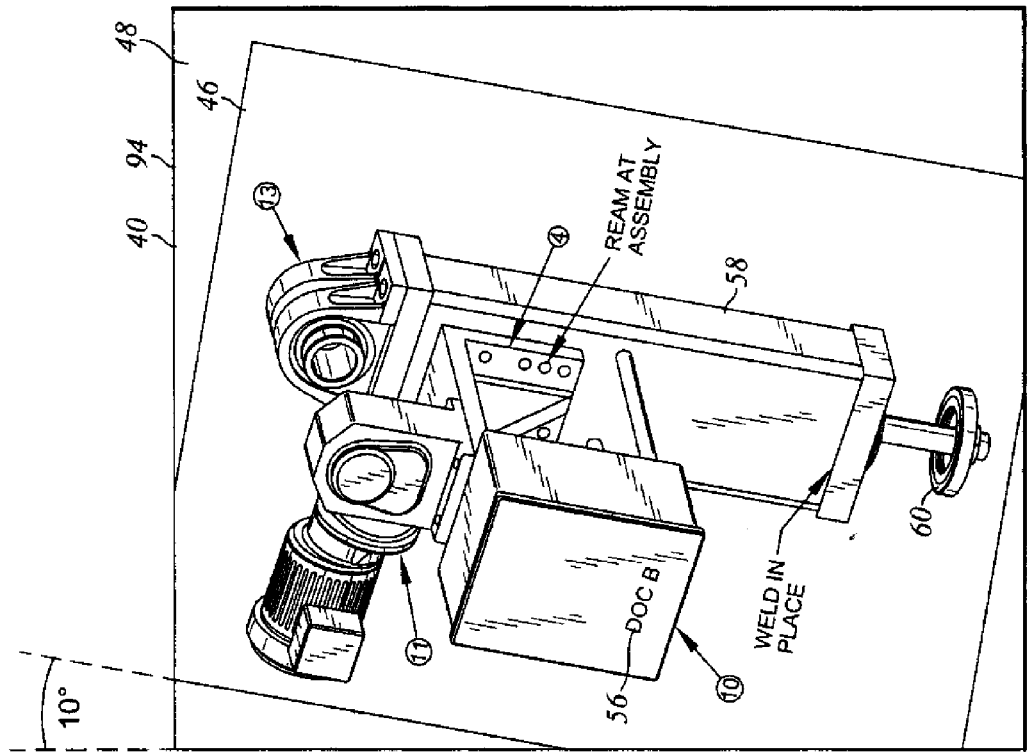
FIG. 4 is a plan view of exemplary modified document.

The original document 38 includes original content 42 and may further include a background 44. Similarly, the modified document 40 includes modified content 46 and may further include a background 48. In the embodiment depicted, it is contemplated that the original document 38 is generated via a computer application and exists as a first bitmap. The modified document 40 may be representative of a physical document that has been scanned or digitized. In this regard, the modified content 46 may be disposed at an angle. As indicated in FIG. 4, the modified content 46 is disposed at a 10 degree angle (rotated to clock-wise) with respect to the boundaries of the modified document 40. This would arise in the context of an operator of a scanning device have poor alignment skills, for example.

It will be appreciated that the particular original and modified content 42, 46 of the original and modified documents 38, 40, which are mechanical drawings of machinery components, are presented by way of example only and not of limitation. The original document 38 may include various data objects, which may be any graphical object, text or symbol. For example, the original document 38 includes data object 50 which is text and data objects 52 and 54 which are graphical objects. Similarly, for example the modified document 40 includes data object 56 which is text and data objects 58 and 60 which are graphical objects. In this embodiment, the only differences between the original content 42 and the modified content 42 are the data objects 50, 54, 56, 60.

An aspect of the present invention relates to a method for comparing the original and modified documents 38, 40 and emphasizing differences between the compared documents 38, 40. However, the modified content 46 is disposed at an angle in comparison to the original content 42. As such, if a comparison were to be directly performed between the original and modified documents 38, 40, the entirety of the modified content 46 would be indicated as being different from the original content 42 (rather than just the data objects 50, 54, 56, 60). As such, in order to compare the original and modified documents 38, 40 the original and modified documents 38, 40 must be aligned or otherwise translated to a common reference.

Figure 5:
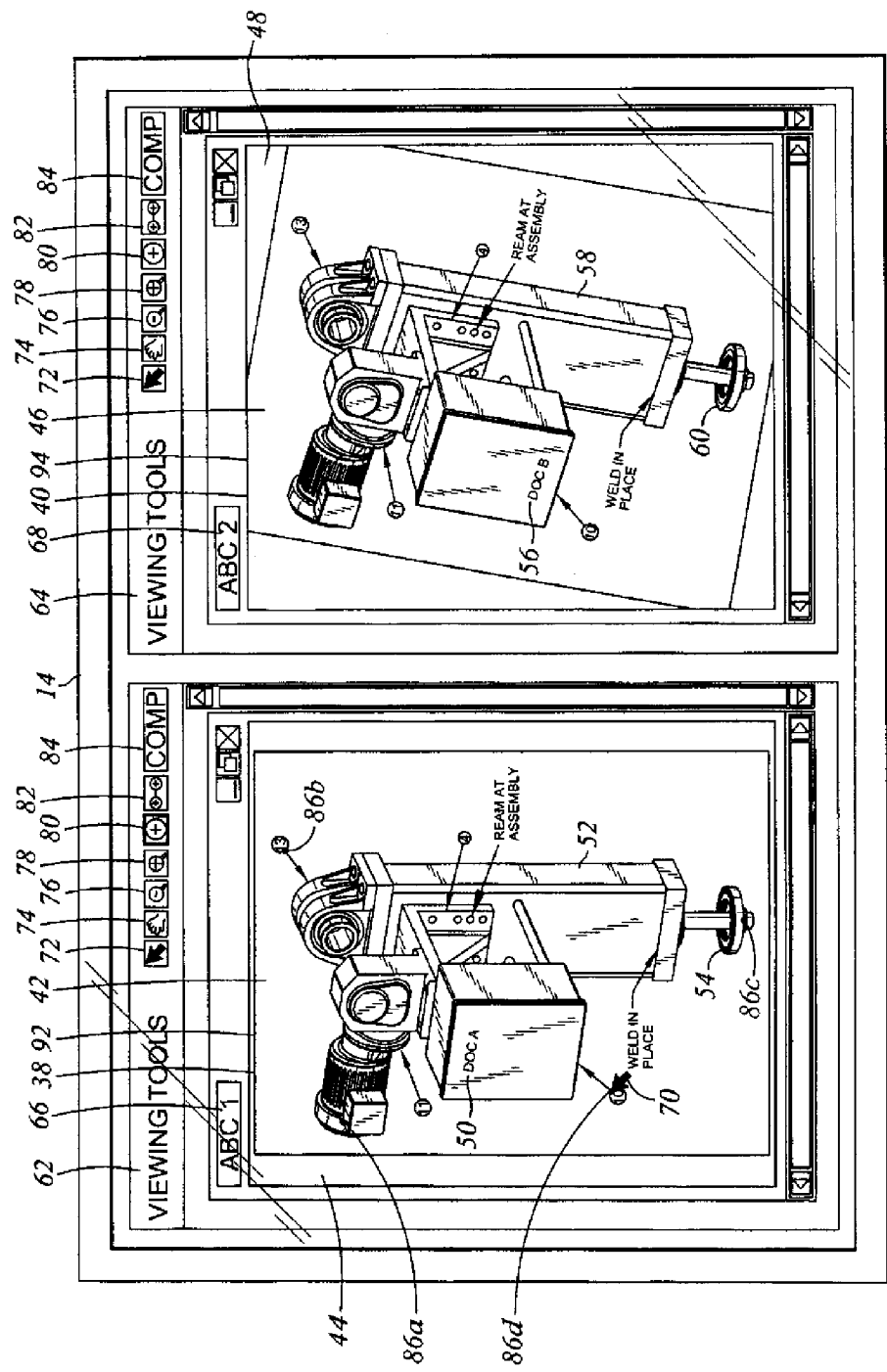
FIG. 5 is a plan view of a display monitor displaying the original and modified documents in respective workspace windows with first, second, third and fourth reference points indicated upon the original document.

Referring additionally to FIG. 5 there are depicted first and second workspace windows 62, 64 that may be displayed upon the display monitor 14. The first and second workspace windows 62, 64 may be launched and controlled by an application residing in computer memory of the computer system 10. The original document 38 is displayed within the first workspace window 62, and the modified document 40 is displayed within the second workspace window 64. Tabs 66, 68 may be respectively used to identify the document and/or the instance of the document being displayed within the first and second workspace windows 62, 64 and may include identifying indicia (sample indicia of "ABC 1" and "ABC 2" are indicated). While the original and modified documents 38, 40 are depicted in this embodiment as being in separate widows, the first and second workspace windows 62, 64, it is contemplated that other window display arrangement may be utilized. For example, the original and modified documents 38, 40 may be displayed in a common window, in a tile or split view format, or in a tabbed view format for examples.

With regard to the specific interaction between a user and the computer system 10, a cursor 70 is directed via the mouse 18 to locations within the display monitor 14. The cursor 70 is depicted over the original content 42. The mouse 18 may include one or more mouse buttons. The application defines a number of interactive elements which may be visually connected to the first and second workspace windows 62, 64 or accessed via menus or pop-up menus for example. A data processing procedure may be initiated by the user activating such interactive elements through clicking the mouse buttons while the cursor 66 is positioned on or near the interactive element. Additionally, a key or keys on the keyboard 16 may be pressed to initiate a data processing procedure. It will also be understood by a person having ordinary skill in the art that while the following description of the invention refers to steps carried out in an exemplary computer system 10, any other data processing device having similar functionality may be used without departing from the scope of the invention. Moreover, while the following description of the invention refers to "clicking" a mouse button, "positioning" a cursor 70 within the monitor 14, "selecting" using the cursor 70 and so forth, a person having ordinary skill in the art will recognize these terms to refer to any similar user interaction with the computer system 10 through a graphical user interface.

In the embodiment illustrated, the first and second workspace windows 62, 64 each includes interactive elements in a toolbar that has various example viewing tools. As will be discussed in further detail, the viewing tools include a cursor icon 72, a translation icon 74, a demagnify icon 76, a magnify icon 78, a reference point icon 80, a reference bar icon 82, and a comp ("comparison") icon 84.

In the first workspace window 62, the reference point icon 80 is "highlighted" indicating that the associated application has been activated by the user. The functionality of the mouse 18 and cursor 70 may be programmed so as to place a reference point at those locations where a mouse button click is received while the cursor 70 is positioned over the original document 38. A first reference point set is defined by a plurality of reference points, namely first, second, third and fourth reference points 86a-d, that are user-selected. In this embodiment, the user selects the first reference point set by navigating the cursor 70 within the original document boundary 92. A reference point is selected by a clicking of a mouse button of the mouse 18. It is presumed that the user has indeed navigated the cursor 70 to each of the four locations where the reference points 86a-d are located and had clicked the mouse button so as to input to the system unit 12 that such location for the intended reference points. Other techniques may be utilized to receive the user-selected reference points that are well known to one of ordinary skill in the art, and may include use of the keyboard 16, stylus or other input device. It is contemplated that additional or fewer number of reference points may define the reference point set.

Figure 6:
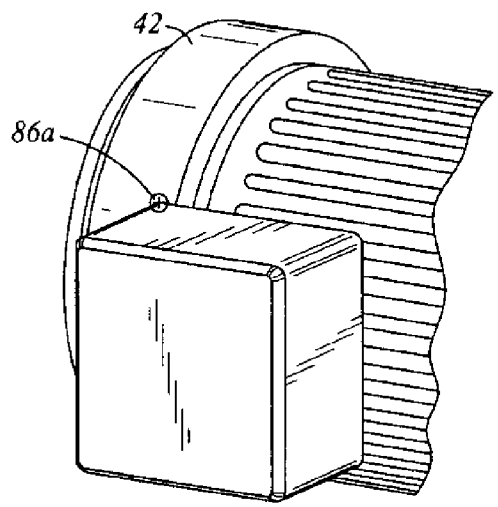
FIG. 6 is an enlarged view of a portion of the original document of FIG. 5 including the first reference point.
Figure 7:
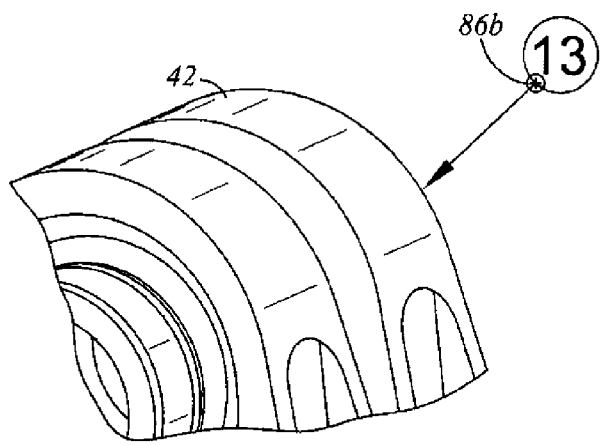
FIG. 7 is an enlarged view of a portion of the original document of FIG. 5 including the second reference point.
Figure 8:
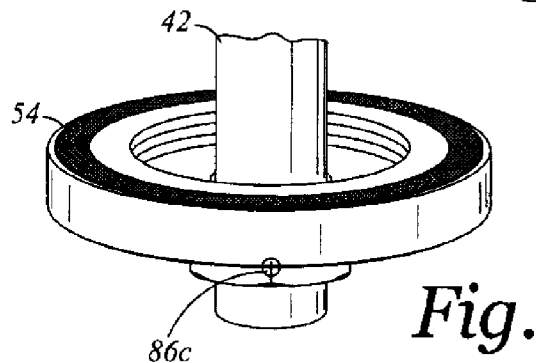
FIG. 8 is an enlarged view of a portion of the original document of FIG. 5 including the third reference point.
Figure 9:
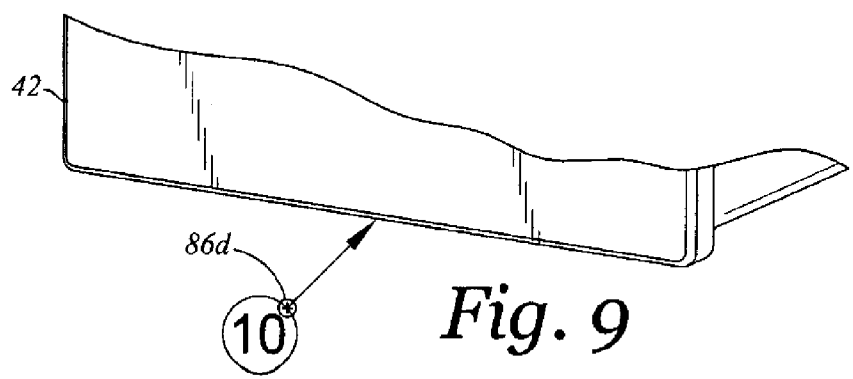
FIG. 9 is an enlarged view of a portion of the original document of FIG. 5 including the fourth reference point.

In further detail, referring additionally to FIGS. 6-9, there are respectively depicted enlarged views of portions of the original content 42 of the original document 38 containing each of the first, second, third and fourth reference points 86a-d as displayed in the first workspace window 62 FIG. 5. It is contemplated that the user may strategically select specific locations of the reference points. In this regards, the user would be encouraged to select locations which would be relatively easy to "re-locate" upon the modified content 46 of the modified document 40. Thus selecting locations where the original content 42 includes data objects that provide an easily identifiable visual reference to the user to ascertain the location. In FIG. 6 for example, the first reference point 86a is depicted as having been selected at a location of a base corner of a data object. In FIG. 7 the reference point 86b is depicted as having been selected at a location of where a lead line intersects a circle. In order to assist the user in the careful and deliberate selection of the reference points, the user may activate the magnify icon 78. This would enable the user to more precisely place the location of the reference points. It is recommended that the user choose a first reference point that is in the upper left quadrant of the subject documents then choose subsequent reference points in a spaced-apart manner moving generally clockwise about the document.

It is desired to select a second reference point set including a plurality of reference points correlated to coordinates within the modified document boundary 94. The reference points of the second reference point set should be selected so as to correspond to locations about the modified content 46 that are the same as those respective locations of the reference points 86a-d about the original content 42. By selecting such corresponding locations, the first and second reference point sets may be used to align or otherwise facilitate a translation of the original and modified documents 38, 40 to a common reference for subsequent comparison. As will be next discussed, there is an embodiment for facilitating the selection of the second reference point set.

Figure 10:
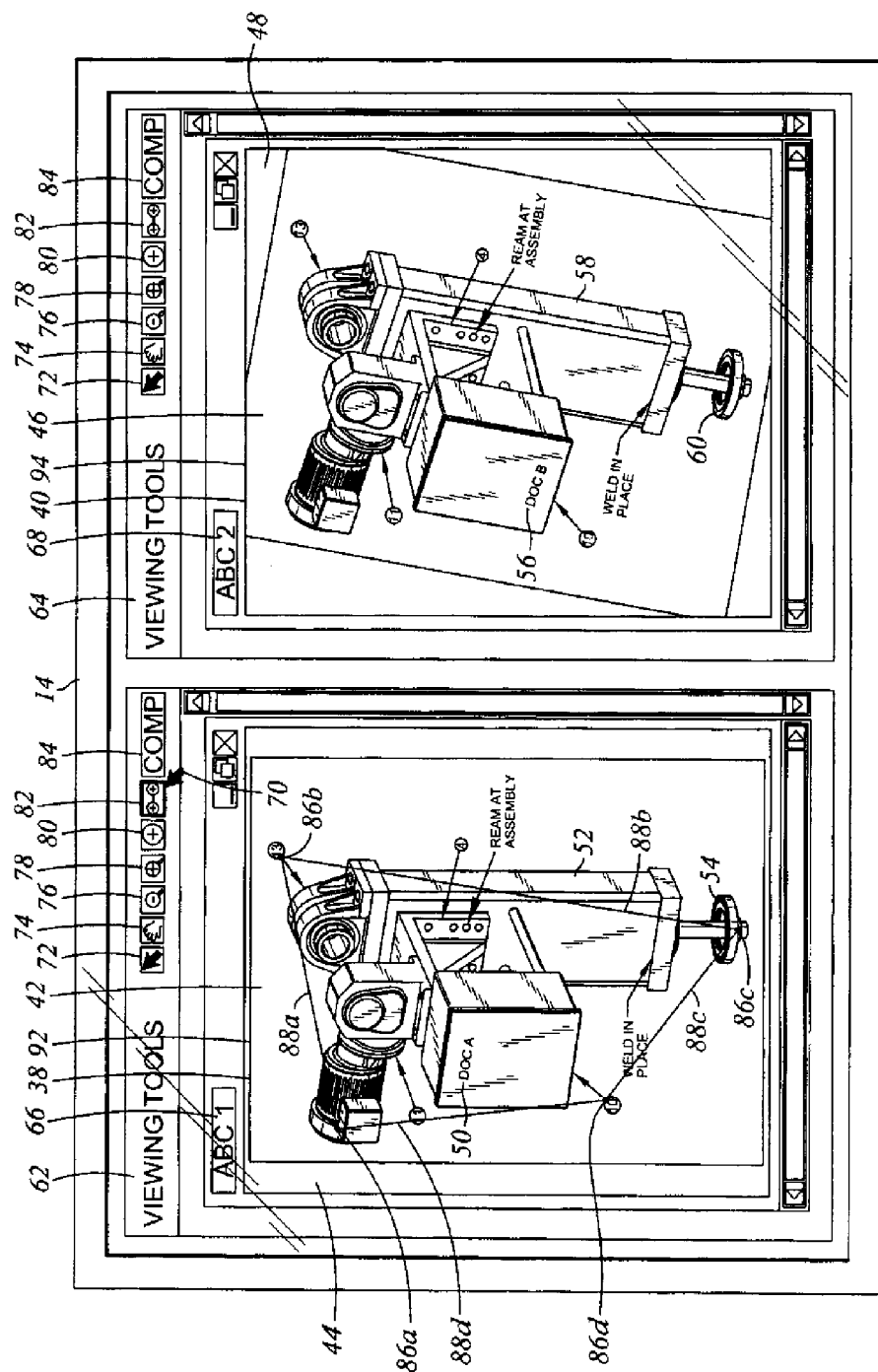
FIG. 10 is the plan view of the display monitor of FIG. 5, however, with reference bars displayed sequentially between the first, second, third and fourth reference points.

Referring now to FIG. 10 there is depicted a plan view of the display monitor 14 of FIG. 5, however, with reference bars 88*a-d* displayed sequentially between the first, second, third and fourth reference points 86*a-d*. As is depicted, the reference bar icon 82 is highlighted indicating that the associated application has been activated by the user. The associated application of the reference bar icon 82 may be configured to provide line segments or bar between sequential reference points. As such, the activation of the reference bar icon 82 results in the display of the reference bars 88*a-d*. It is understood that the reference bars 88*a-d* are not required to practice the present invention. However, the reference bars 88*a-d* are contemplated to visually aid the user in viewing and placement of the location of the reference points 86*a-d*.

Figure 11:
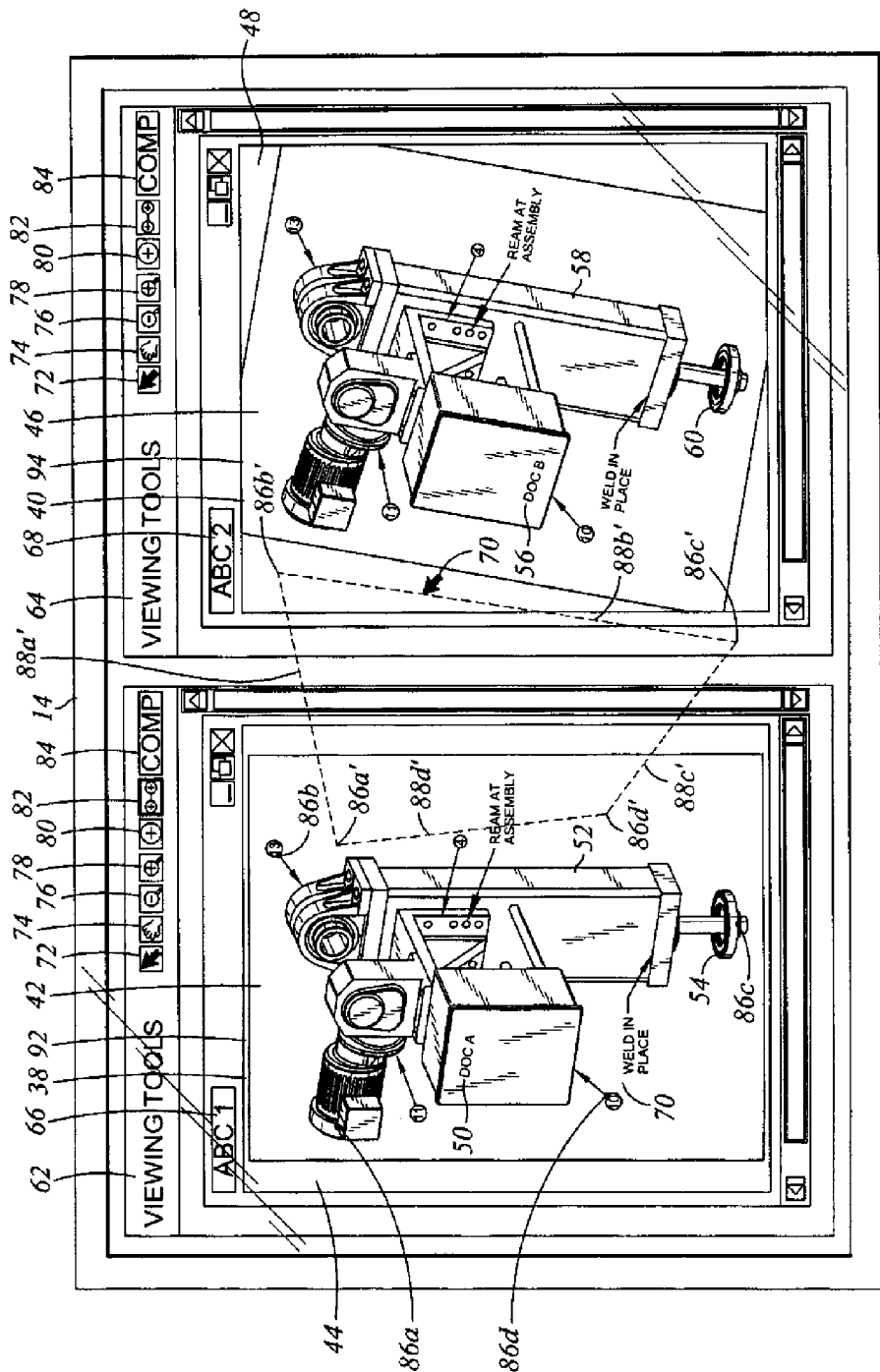
FIG. 11 is the plan view of the display monitor of FIG. 10, however, with a ghost image of the reference bars and points being dragged between the display of the original and modified documents.

Referring now to FIG. 11 there is depicted the plan view of the display monitor 14 of FIG. 10, however, with a ghost image of the reference points 86*a-d* and reference bars 88*a-d* being dragged between the display of the original and modified documents 38, 40. In this regard, such ghost image takes the form of reference points 86*a'-d'* and reference bars 88*a'-d'*. Thus, the reference points 86*a'-d'* are a guide data point set that will be used to guide the user to select a second reference point set in relation to the modified document 40. With reference to FIG. 10, the user may click in the reference bar 88*b*. Subsequent movement of the cursor 70 (while still holding down the mouse button) results in the launching of a "grabbed" ghost image in the form of the reference points 86*a'-d'* and the reference bars 88*a'-d'*. Movement of the cursor 70 translates ("drags") the reference points 86*a'-d'* and the reference bars 88*a'-d'*. FIG. 11 depicts the user in the process of dragging the reference points 86*a'-d'* and the reference bars 88*a'-d'* from over the original content 42 to over the modified content 46. In other embodiments such translation may be achieved by other methods, such as through the use of the keyboard 16, for example.

Figure 12:
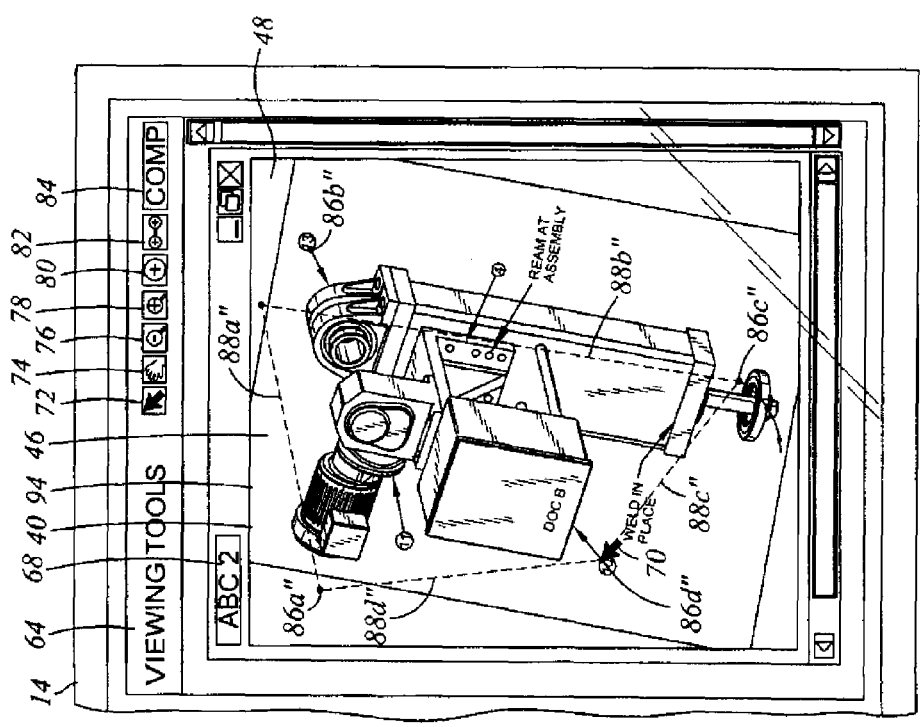
FIG. 12 is the plan view of the right hand portion of display monitor of FIG. 11, however, with the ghost image of the reference bars and points overlayed upon the display of the modified document.

Referring now to FIG. 12 there is depicted the plan view of the right-hand portion of the display monitor 14 of FIG. 11, however, with the differences noted. In this figure, the user has dragged the ghost image of the reference points 86*a-d* and reference bars 88*a-d* in the form of the reference points 86*a'-d'* and reference bars 88*a'-d'* and has decoupled the cursor 70 from such ghost image (such as by releasing of the mouse button from a held down position while dragging). Upon such decoupling, reference points 86*a"-d"* and reference bars 88*a"-d"* are provided over the modified content 46. The user may navigate the cursor 70 to grab a respective one of the reference points 86" for subsequent placement about the modified content 46. In this case, the reference point 86*d"* is depicted to have been selectively placed by the user at a desired position (i.e., at the base of a lead line that intersects a circle). This corresponds to the same location of the reference point 86*d* in relation to the original content 42. It is contemplated that such precise placement may be facilitated through the use of the magnify icon 78 and associated functionality that enlarges the scale of the displayed document. Moreover, the application may be programmed so as to facilitate a clicked reference point to become a "pivot point" for later translation of the overall grouping of the reference points 86*a"-d"* and reference bars 88*a"-d"*. This pivoting action will be discussed below.

Figure 13:
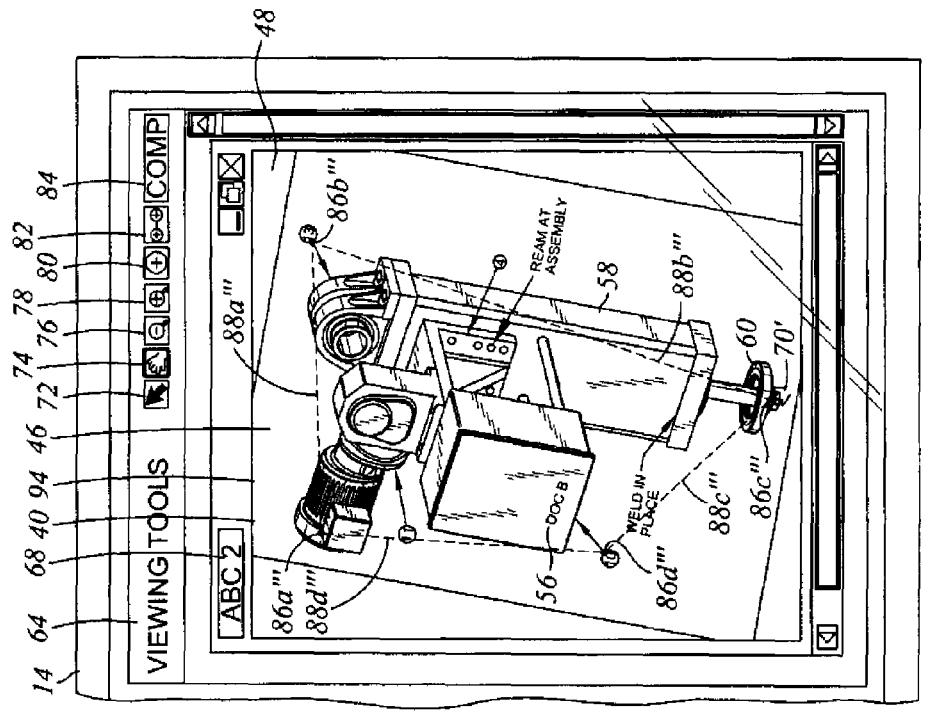
FIG. 13 is the plan view of the right hand portion of display monitor of FIG. 12, however, with the ghost image of the reference bars and points being rotated clock-wise.

Referring now to FIG. 13 there is depicted the plan view of the right-hand portion of the display monitor 14 of FIG. 12, however, with the differences noted. In this figure, the user has activated the translation icon 74. The activation of the translation icon 74 visually changes the appearance of the cursor 70 to the cursor 70'. This provides the user with a visual indicator indicating to the user that the tool has been selected and that the functionality associated with the mouse control and cursor 70' is different than the cursor 70. In this embodiment the user may "click" on any of the reference points 86*a"-d"* and the reference bars 88*a"-d"* with the cursor 70'. Subsequently, movement of the cursor 70" translates ("drags") the reference points 86*a"-d"* and the reference bars 88*a"-d"*. However, where a reference point has been selected as a "pivot point" such as in the case of the reference point 86*d"* such dragging results in a pivoting about the selected reference point 86*d"*. As is depicted in FIG. 13 the over all grouping of the reference points 86*a"-d"* and reference bars 88*a"-d"* are rotated about the reference point 86*d"* so as to come to a final resting position as are respectively designated as reference points 86*a'"-d'"* and reference bars 88*a'"-d'"*.

The present invention recognizes that by selectively placing the second reference point set (in the form of the reference points 86*a'"-d'"*) at locations in the modified document 40 that correspond to similar locations of the reference points 86*a-d* in the original document 38, that such reference points 86*a'"-d'"* and 86*a-d* may be used to convert the original and modified documents 38, 40 to a common reference so as to account for differences in alignment of the original content 42 and the modified content 46 (i.e., an offset angle between the original content 42 and the modified content 46). While the foregoing embodiment contemplated placement of the second reference point set through the use of a "ghosted" image of the reference points 86*a-d*, it is contemplate that such "ghosting" is not required. Each of the reference points of the second reference point set may be individuals located and selected.

Figure 14:
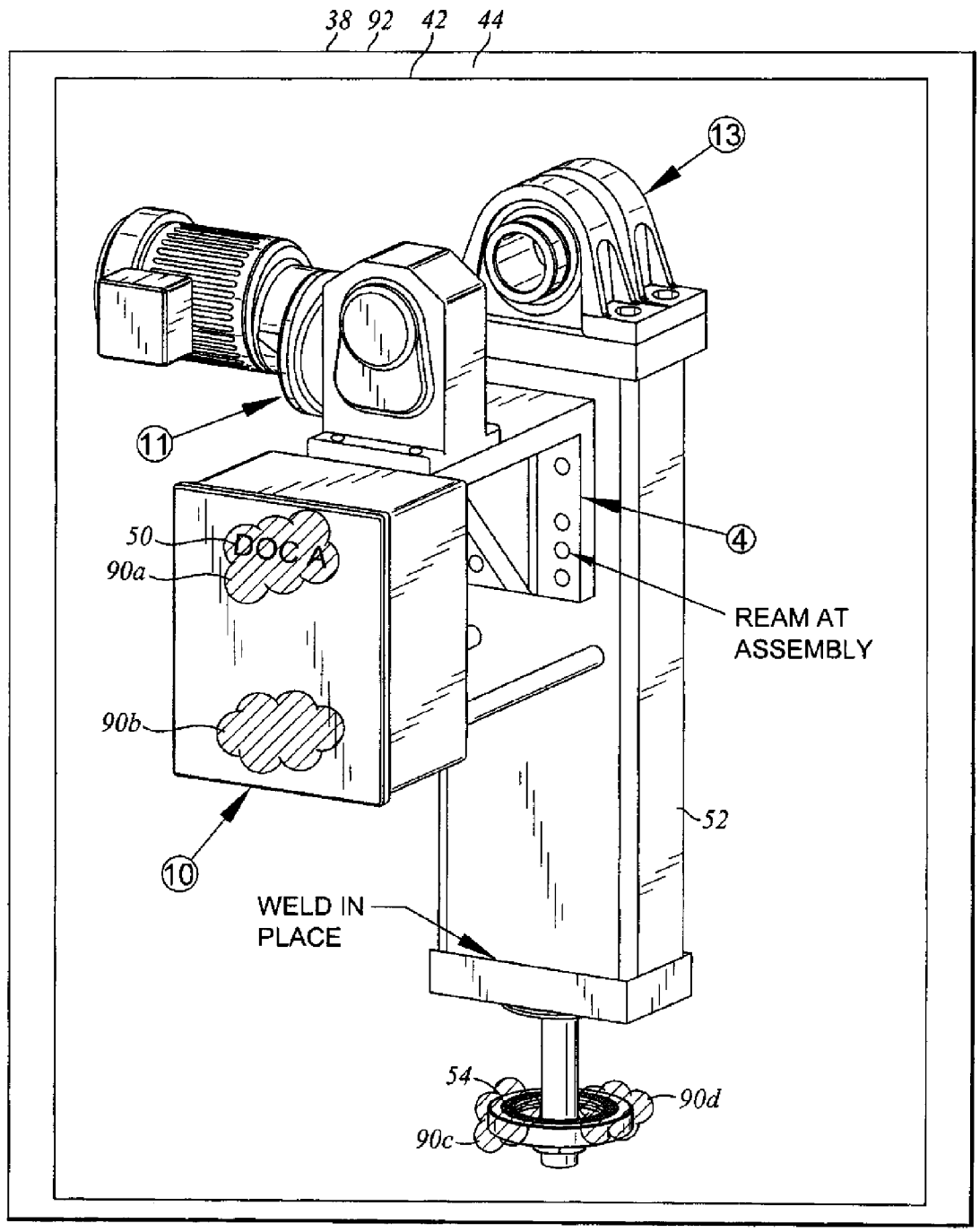
FIG. 14 is an enlarged view of the displayed original document after having the compare application apply indicia indicating differences between the original and modified documents.

In this regard, the user now having inputted to the system unit 12 the user-selected first and second reference point sets, the user may now activate the comp icon 84. Referring now to FIG. 14, there is depicted the original document 38 as displayed in the first workspace window 62. In addition, there is depicted indicia 90*a-d* that is overlayed upon the original content 42. This is a result of the comp icon 84 of the first workspace window 62 having been activated by the user. The comp icon 84 launches a comparison application.

In this embodiment, indicia 90*a-d* takes the form of a cloud-like object that extends about the particular locality where there are differences between the original and modified content 42, 46 (after taking into account the offset angle between the original and modified content 42, 46). As is depicted, indicia 90*a* appears about the data object 50 (the text element denoted as "DOC A"). This is because no such corresponding data object appears at such location in the modified content 46. Further, indicia 90*b* appears at a location where the data object 56 (the text element denoted as "DOC B") is located in the modified content 46. It is contemplated that the indicia may take other forms, such as text, other graphical shapes and shading.

The comparison application is configured to recognize that the original and modified documents 38, 40 define the first and second bitmaps. Further, the comparison application is configured to recognize that the user-selected first reference point set including a plurality of reference points (in this case, the reference points 86*a-d*) are correlated to coordinates within the original document boundary 92, and that the user-selected second reference point set including a plurality of reference points (in this case, the reference points 86*a'"-d'"*) are correlated to coordinates within the modified document boundary 94. The comparison application is further configured to perform a processing step of transforming the first bitmap to a common reference using the first reference point set and the second bitmap to the common reference using the second reference point set. The application then performs the step of comparing the first and second bitmaps. Finally, the application displays indicia, such as indicated 90*a-d*, upon the display monitor 14 related to the comparison of the first and second bitmaps.

The step of transforming the first and second bitmaps may include applying an inverse transform matrix function to the bitmaps, with the offset angle between the original content 42 and the modified content 46 being the parameter to such function. The inverse transform matrix function rotates the second bitmap to be in alignment with the common reference. The amount of rotation is determined by the offset angle. It is contemplated that one of ordinary skill in the art may utilize any of those well know techniques for transforming the first and second bitmaps to a common reference to account for the offset angle by utilizing the first and second reference point sets as inputs. In another aspect, the inverse transform matrix function may include a scaling function. In this regard, the first and second reference point sets may account of scales differences between the original and modified content 42, 46. Alternatively, the associated scale values may simply be a user input for use by the comparison application. It is contemplated that transform functionality of the compare application may be provided in standard libraries such as the Microsoft .NET Matrix object. It is understood that any standard library capable of implementing the foregoing inverse transform matrix functions may be readily substituted without departing from the scope of the present invention.

Referring now to FIGS. 15-18, there is depicted another embodiment. Similar reference numerals as those in relation to the embodiments shown in FIGS. 1-14 are used to indicate similarly configured components, however, with those differences as noted below.

Figure 15:
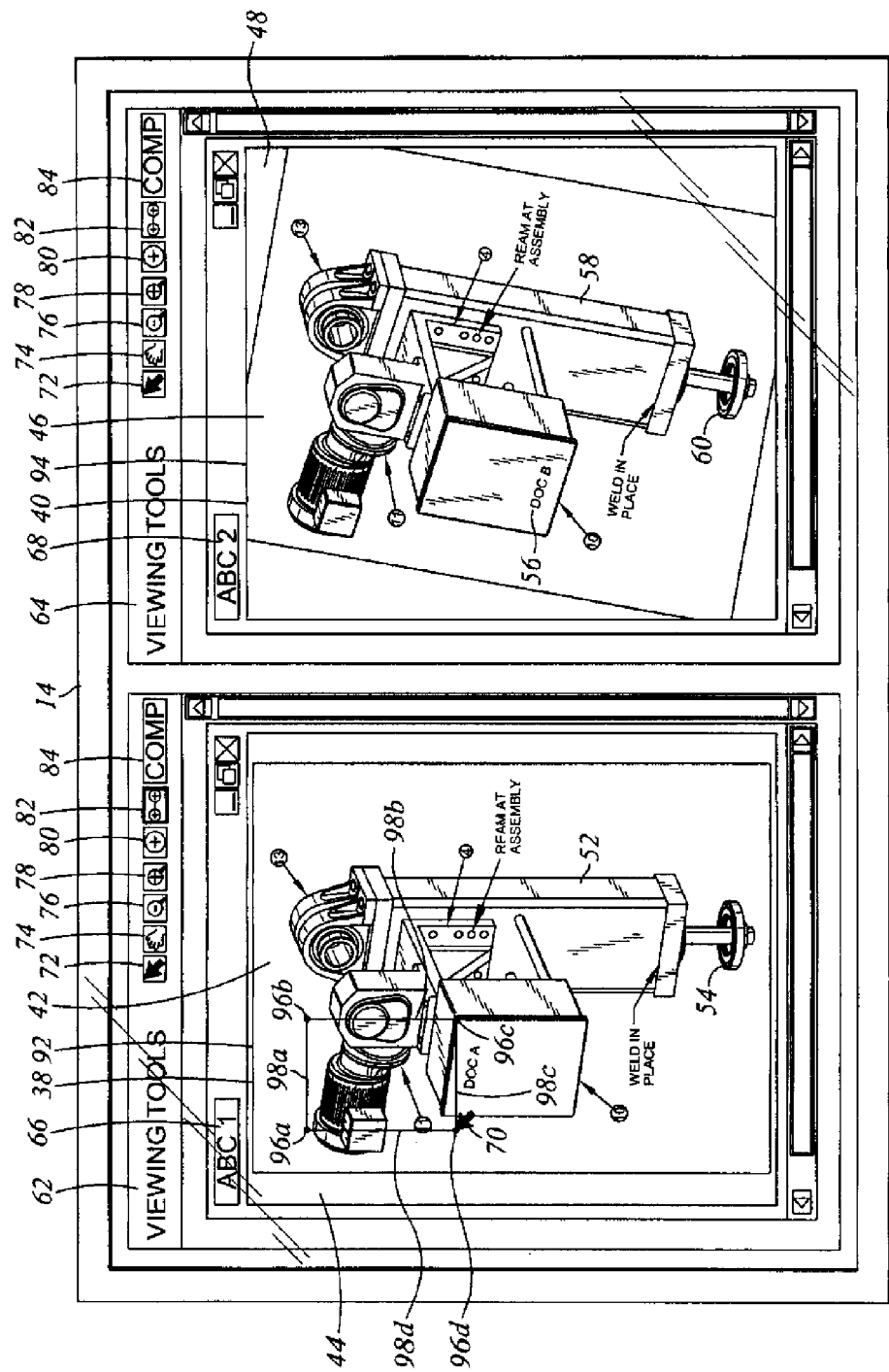
FIG. 15 is a plan view of the display monitor according to another embodiment displaying the original and modified documents in respective workspace windows with first, second, third and fourth reference points and bars forming a rectangle indicated upon the original document.

FIG. 15 depicts the reference bar icon 82 having been selected. In this embodiment, the related application results in the formation of a sizable reference rectangle as defined by the reference points 96*a-d* and the reference bars 98*a-d*. The reference rectangle may be size by "grabbing" a selected one of the reference points 96*a-d*. Once the user is satisfied with the location and sizing of the reference rectangle, the user may navigate the cursor 70 to a respective one of the reference bars 98*a-d*.

Figure 16:
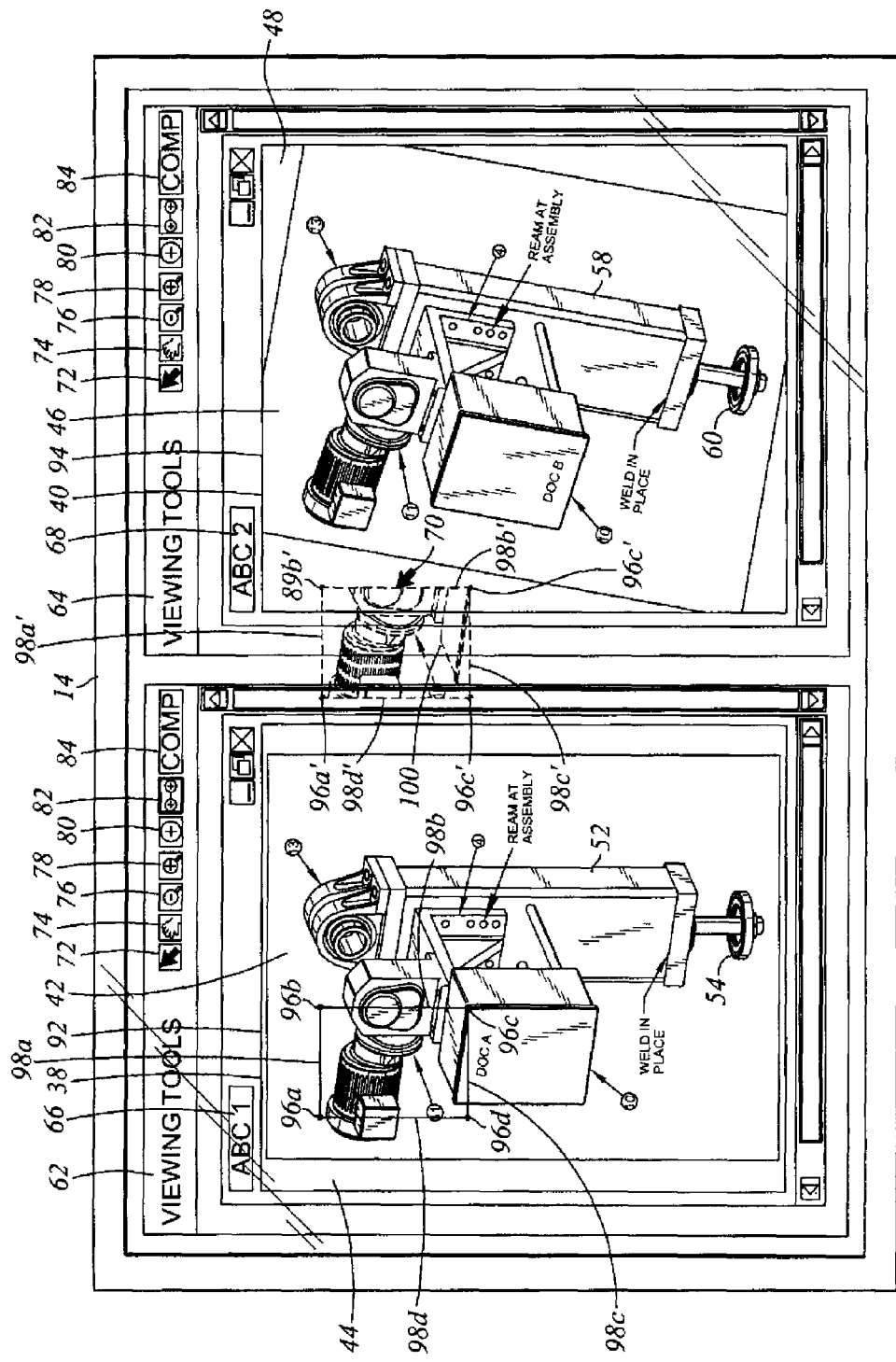
FIG. 16 is the plan view of the display monitor of FIG. 15, however, with a ghost image of the reference bars and points and associated portion of the original document being dragged between the display of the original and modified documents.

Referring now to FIG. 16 there is depicted the plan view of the display monitor 14 of FIG. 15, however, with the differences noted. There is depicted a ghost image 100 of the portion of the original content 42 as bounded by the reference points 86*a-d* and reference bars 88*a-d*. The ghost image 100 is launched upon the user grabbing (by way of pointing and clicking) the reference bar 98*b* and navigating the cursor to the right. The ghost image 100 is launched and is depicted as being dragged between the display of the original and modified documents 38, 40. The ghost image 100 is defined by reference points 96*a'-d'* and reference bars 98*a'-d'*. The ghost image 100 and the reference points 96*a'-d'* are a guide reference point set that will be used to guide the user to select a second reference point set in relation to the modified document 40.

Figures 17, 18:
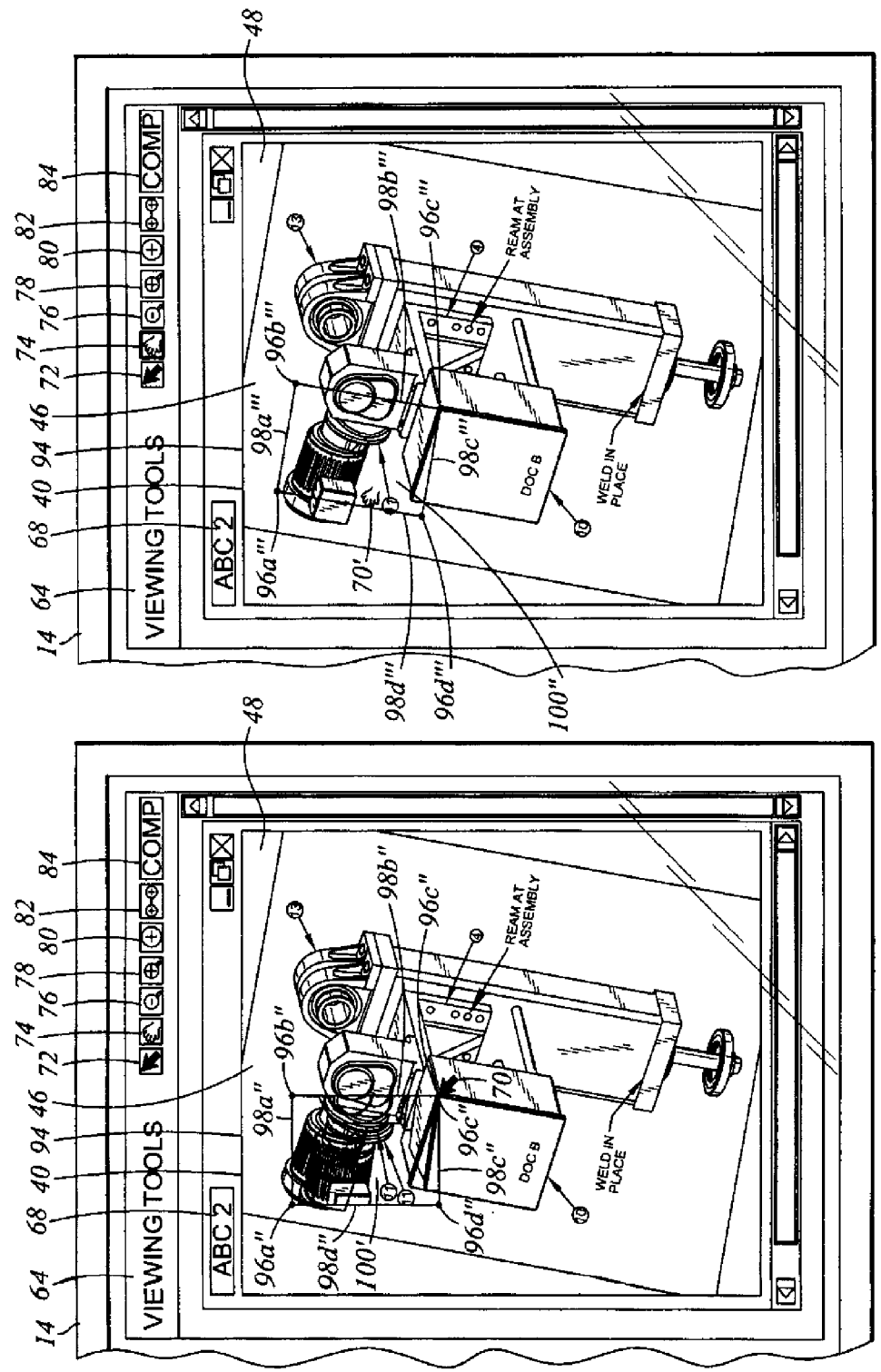
FIG. 17 is the plan view of the right hand portion of display monitor of FIG. 16, however, with the ghost image of the reference bars and points and associated portion of the original document overlayed upon the display of the modified document.
FIG. 18 is the plan view of the right hand portion of display monitor of FIG. 17, however, with the ghost image of the reference bars and points and associated portion of the original document being rotated clock-wise.

Referring now to FIG. 17 there is depicted the plan view of the right-hand portion of the display monitor 14 of FIG. 16, however, with the differences noted. In this figure, the user has dragged the ghost image 100 and has decoupled the cursor 70 from such ghost image 100 (such as by releasing of the mouse button from a held down position while dragging). Upon such decoupling, the ghost image is denoted as 100', and the reference points are denoted as 96*a"-d"* and the reference bars are denoted as 98*a"-d"*. The user may navigate the cursor 70 to grab a respective one of the reference points 96*a"-d"* for subsequent placement about the modified content 46. In this case, the reference point 96*c"* is depicted to have been selectively placed by the user at a desired position (i.e., at the corner of a cubic structure). This corresponds to the same location of the reference point 96*c* in relation to the original content 42. It is contemplated that such precise placement may be facilitated through the use of the magnify icon 78 and associated functionality that enlarges the scale of the displayed document. Moreover, the application may be programmed so as to facilitate a clicked reference point to become a "pivot point" for later translation of the overall grouping of the ghost image 100', the reference points 96*a"-d"* and the reference bars 98*a"-d"*. This pivoting action will be discussed below. It is contemplated that the ghost image 100' as overlayed upon the modified content 42 provides a visual aid to the user that the modified content is skewed at an offset angle.

Referring now to FIG. 18 there is depicted the plan view of the right-hand portion of the display monitor 14 of FIG. 17, however, with the differences noted. In this figure, the user has activated the translation icon 74. The activation of the translation icon 74 visually changes the appearance of the cursor 70 to the cursor 70'. This provides the user with a visual indicator indicating to the user that the tool has been selected and that the functionality associated with the mouse control and cursor 70' is different than the cursor 70. In this embodiment the user may "click" on any of the reference points 96*a"-d"* and reference bars 98*a"-d"* with the cursor 70'. Subsequently, movement of the cursor 70' drags the ghost image 100', and the reference points 96*a"-d"* and the reference bars 98*a"-d"*. However, where a reference point has been selected as a "pivot point" such as in the case of reference point 96*c"* such dragging results in a pivoting about the selected reference point 96*c"*. As is depicted in FIG. 18 the over all grouping of the ghost image 100', the reference points 96*a"-d"* and reference bars 98*a"-d"* are rotated about the reference point 96*c"* so as to come to a final resting position as are respectively designated as a ghost image 100", reference points 96*a'"-d'"* and reference bars 98*a'"-d'"*. Thus, the visual alignment of the ghost image 100" may be used in comparison to the adjacent modified content 46 so as to guide the user to precisely select the locations for the reference points 96*a"-d"* that define the second reference point set.

Referring now to FIGS. 19-22, there is depicted another embodiment. Similar reference numerals as those in relation to the embodiments shown in FIGS. 1-14 are used to indicate similarly configured components, however, with those differences as noted below.

Figure 19:
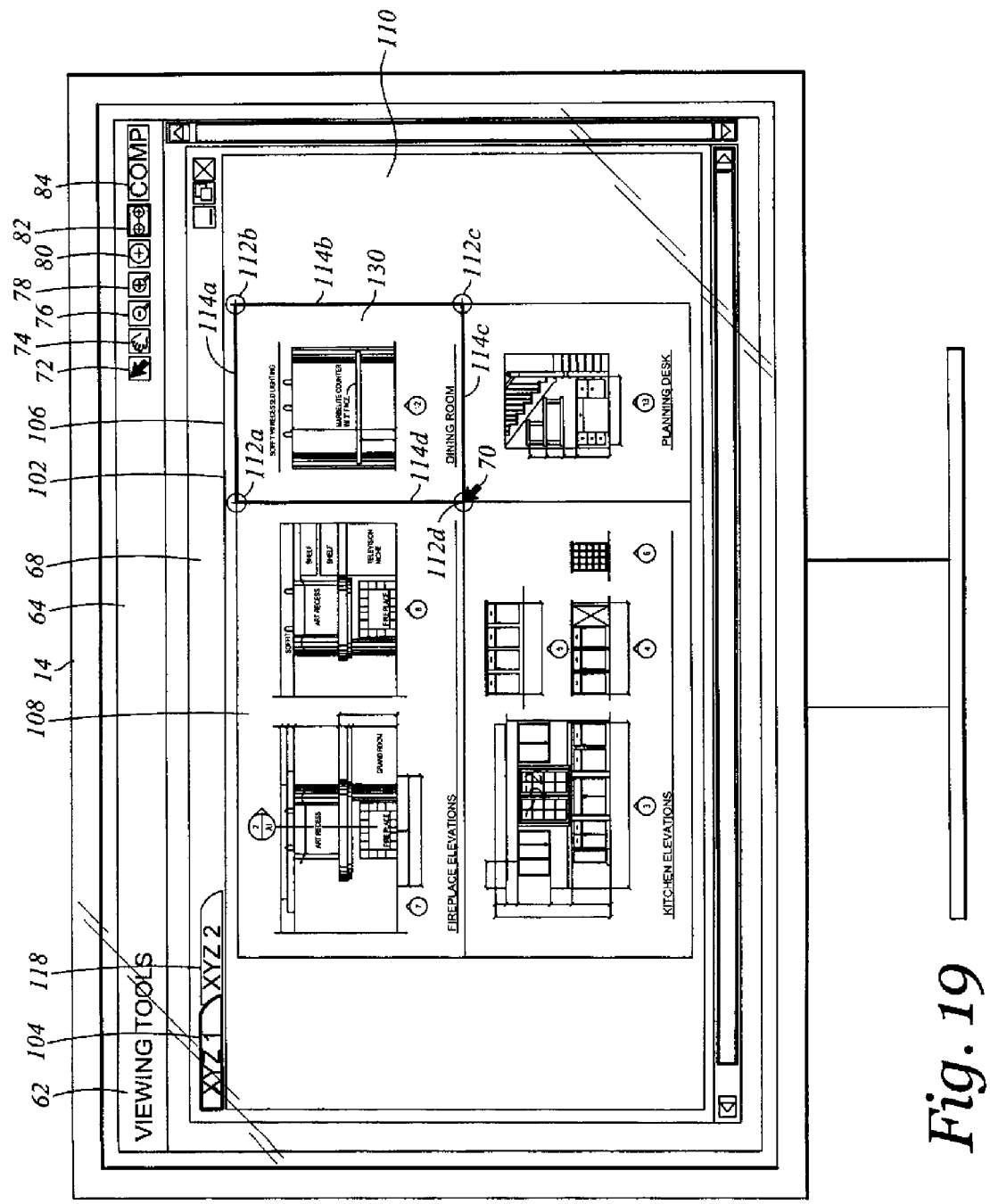
FIG. 19 is a plan view of the display monitor according to another embodiment displaying an original document in a tabbed view in a workspace window with first, second, third and fourth reference points and bars forming a rectangle about a first region upon the original document.
Figure 20:
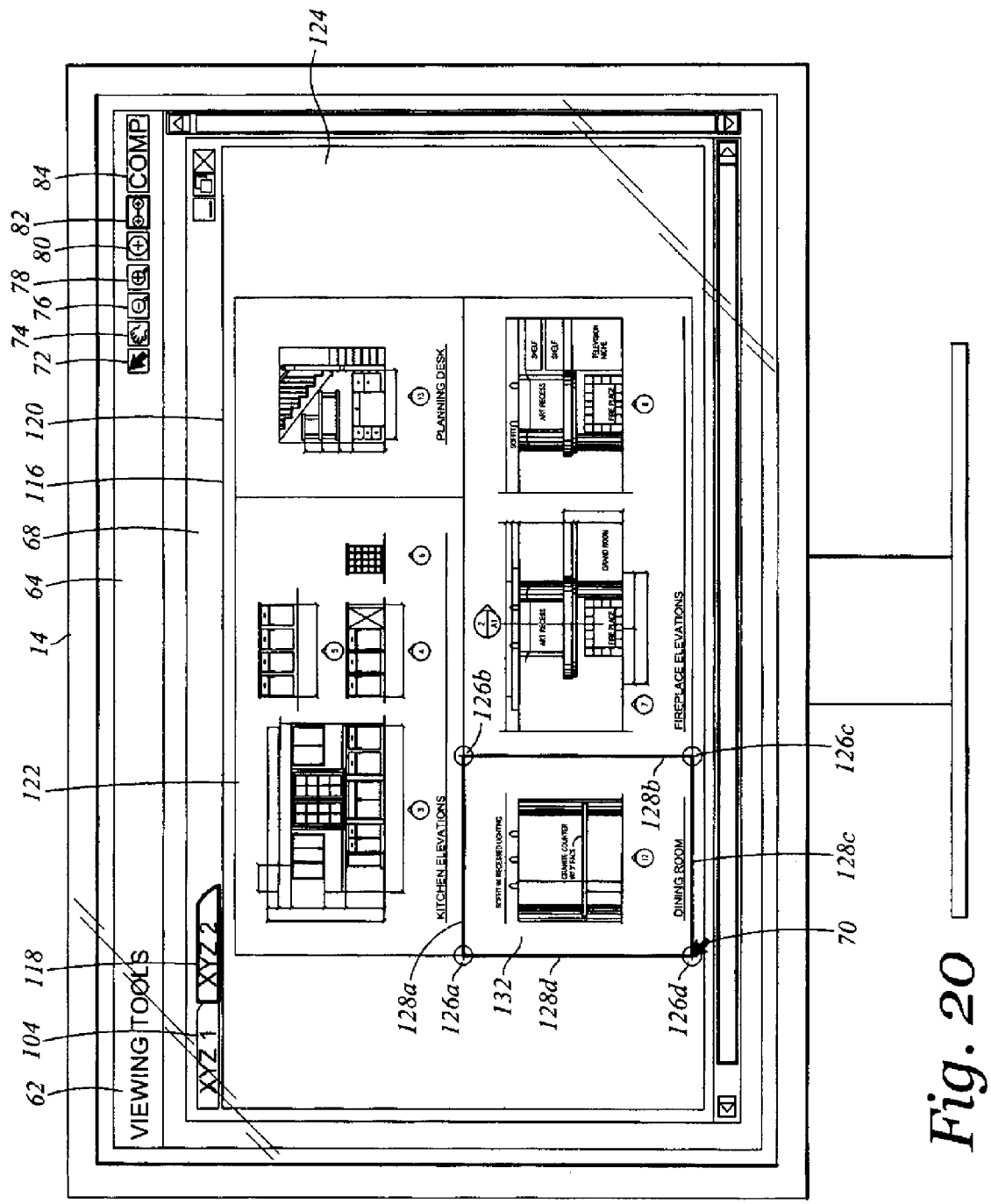
FIG. 20 is the plan view of the display monitor of FIG. 19, however, with a modified document displayed in a tabbed view in the workspace window with first, second, third and fourth reference points and bars forming a rectangle about a second region upon the modified document.

With reference to FIG. 19, in this embodiment there is provided a first workspace window 102 that may be displayed upon the display monitor 14. An original document 106 is displayed within the first workspace window 102. Tabs 104 may be used to identify the document and/or the instance of the document being displayed within the first workspace window 102 and may include identifying indicia (sample indicia of "XYZ 1" indicated). A tab 118 is also depicted that includes identifying indicia (sample indicia of "XYZ 2" is indicated). In this regards, a tabbed view is presented. Referring additionally to FIG. 20, an modified document 120 is displayed within a second workspace window 116 and is associated with the tab 118. The original document 106 includes original content 108 and a background 110. The modified document 120 includes modified content 122 and a background 124.

In this embodiment, the original content 108 and the modified content 122 relate to architectural drawings. As is sometimes typical, over the course of revisions of such drawings, detailed subdrawings may be shifted in their location about the drawing. If a comparison of two drawing were to be performed, such an application may indicate significant differences. However this would be misleading as no substantive changes may be present other than the change in locations of detailed drawing with the overall drawing.

With reference to FIG. 19, the user may select the reference bar icon 82 and the associated application. Subsequently the user may navigate the cursor 70 to specific locations such as those corresponding to corners of a detailed drawing that is of interest for comparison. In this case, the user has selected and place reference points 112*a-d* at locations about the original content 108. Reference bars 114*a-d* extend between the reference points 112*a-d*. A first reference point set is defined by the reference points 112*a-d*. The first reference point set defines a first region 130.

With reference to FIG. 20, the user may select the reference bar icon 82 and the associated application. Subsequently the user may navigate the cursor 70 to specific locations such as those corresponding to corners of a detailed drawing that is of interest for comparison. In this case, the user has selected and place reference points 126*a-d* at locations about the modified content 122. Reference bars 128*a-d* extend between the reference points 126*a-d*. A second reference point set is defined by the reference points 126*a-d*. The second reference point set defines a second region 132.

Figure 21:
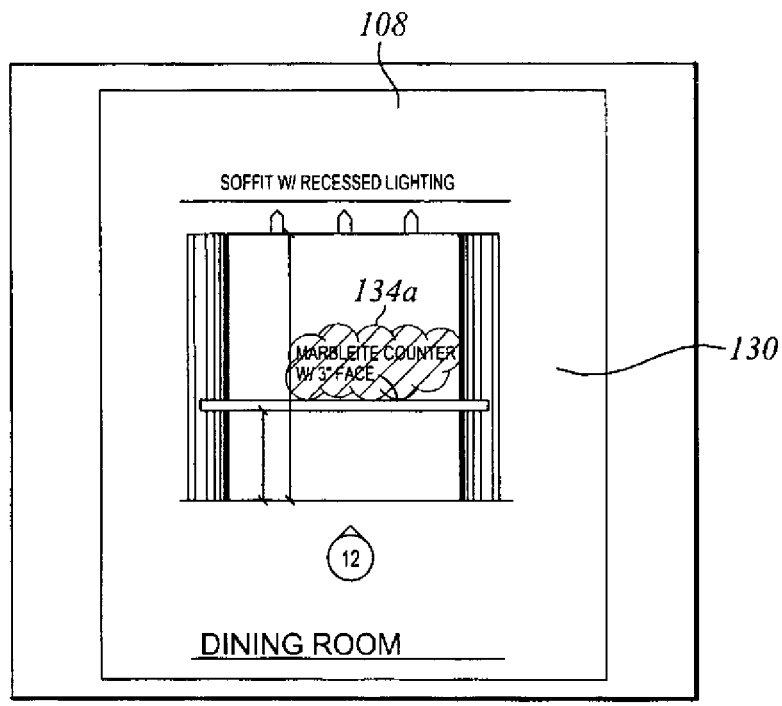
FIG. 21 is an enlarged view of the first region of the displayed original document after having the compare application apply indicia indicating differences between the original and modified documents.
Figure 22:
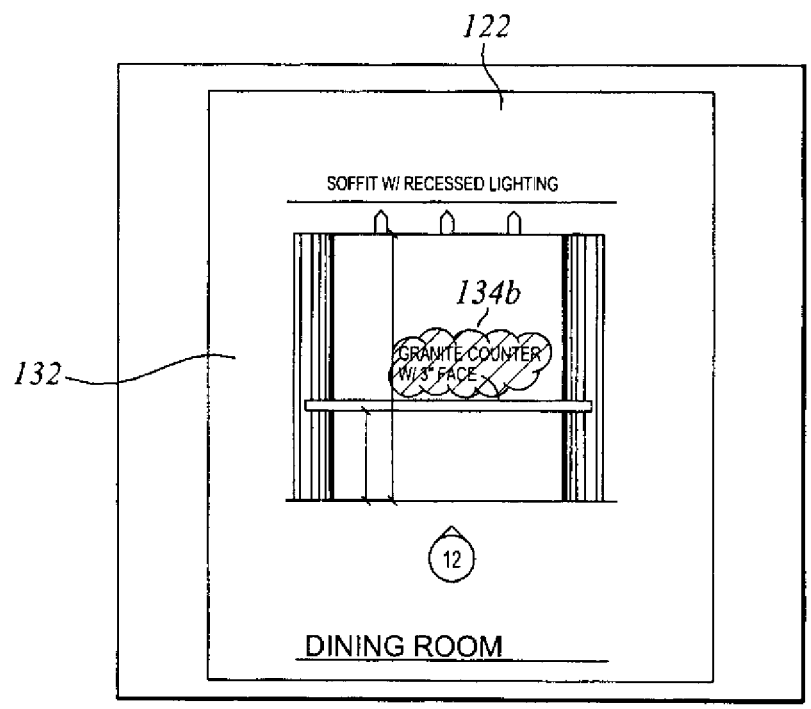
FIG. 22 is an enlarged view of the second region of the displayed modified document after having the compare application apply indicia indicating differences between the original and modified documents.

In this embodiment, the comparison application may be launched through the activation of comp icon 84. In this regard, the comparison application may be configured so as to perform a comparison by comparing only portions of the first and second bitmaps corresponding to the first and second regions 130, 132. Referring now to FIG. 21, there is depicted an enlarged view of the portion of the original content 108 corresponding to the first region 130. Indicia 134*a* is displayed over a portion of the original content 108 that highlights differences between the same location of the second region 132 of the modified content 122. Similarly, referring now to FIG. 22, there is depicted an enlarged view of the portion of the modified content 122 corresponding to the second region 132. Indicia 134*b* is displayed over a portion of the modified content 122 that highlights differences between the same location of the first region 130 of the original content 108.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show any more detail than is necessary for the fundamental understanding of the present invention, the description taken with the drawings making apparent to those skilled in the art how the several forms of the present invention may be embodied in practice.

What is claimed is:

1. A method for emphasizing differences between an original document and a modified document, the method comprising:
    displaying the original document upon a display monitor, the original document defining an original document boundary and a first bitmap;
    displaying the modified document upon a display monitor, the modified document defining a modified document boundary and a second bitmap;
    receiving a user-selected first reference point set including a plurality of reference points correlated to coordinates within the original document boundary;
    receiving a user-selected second reference point set including a plurality of reference points correlated to coordinates within the modified document boundary;
    transforming the first bitmap to a common reference using the first reference point set;
    transforming the second bitmap to the common reference using the second reference point set;
    comparing the first and second bitmaps; and
    displaying indicia upon the display monitor related to the comparison of the first and second bitmaps.

2. The method of claim 1 wherein the indica is superimposed with a display of the original document at locations corresponding to differences between the original and modified document.

3. The method of claim 1, wherein the first and second bitmaps are each defined by a plurality of pixels arranged in ordered rows and columns, each of the pixels having pixel coordinates associated therewith.

4. The method of claim 1 wherein the receiving of the user-selected first reference point set is through the use of a computer mouse.

5. The method of claim 1 wherein the receiving of the user-selected second reference point set includes superimposing a guide data point set with a display of the modified document, the guide data point set is representative of the first reference point set.

6. The method of claim 5 wherein the receiving of the user-selected second reference point set includes rotating the guide data point set relative to the display of the modified document.

7. The method of claim 1 wherein the receiving of the user-selected second reference point set includes superimposing a ghost image with a display of the modified document, the ghost image is representative of a portion of the original document adjacent to the first reference point set.

8. The method of claim 7 wherein the receiving of the user-selected second reference point set includes rotating the guide data point set relative to the display of the modified document.

9. The method of claim 7 wherein the receiving of the user-selected second reference point set includes aligning the ghost image with a corresponding portion of the modified document.

10. The method of claim 1 wherein the first reference point set defines a first region, the second reference point set defines a second region, the comparison of the first and second bitmaps includes comparing only portions of the first and second bitmaps corresponding to the first and second regions.

11. A method for emphasizing differences between an original document and a modified document, the method comprising:
    displaying the original document upon a display monitor, the original document defining an original document boundary and a first bitmap;
    displaying the modified document upon a display monitor, the modified document defining a modified document boundary and a second bitmap;
    receiving a user-selected first reference point set including a plurality of reference points correlated to coordinates within the original document boundary for visual features in the original document;
    receiving a user-selected second reference point set including a plurality of reference points correlated to coordinates within the modified document boundary for visual features in the modified document corresponding to the visual features in the original document;

transforming the first bitmap to a common reference orientation using the first reference point set;

transforming the second bitmap to the common reference orientation using the second reference point set;

comparing the first and second bitmaps; and displaying indicia upon the display monitor related to the comparison of the first and second bitmaps.

12. The method of claim 11, wherein the first and second bitmaps are each defined by a plurality of pixels arranged in ordered rows and columns, each of the pixels having pixel coordinates associated therewith.

13. The method of claim 11 wherein the receiving of the user-selected second reference point set includes superimposing a guide data point set with a display of the modified document, the guide data point set is representative of the first reference point set.

14. The method of claim 13 wherein the receiving of the user-selected second reference point set includes rotating the guide data point set relative to the display of the modified document.

15. The method of claim 11 wherein the receiving of the user-selected second reference point set includes superimposing a ghost image with a display of the modified document, the ghost image is representative of a portion of the original document adjacent to the first reference point set.

16. The method of claim 15 wherein the receiving of the user-selected second reference point set includes rotating the guide data point set relative to the display of the modified document.

17. The method of claim 15 wherein the receiving of the user-selected second reference point set includes aligning the ghost image with a corresponding portion of the modified document.

18. The method of claim 11 wherein the first reference point set defines a first region, the second reference point set defines a second region, the comparison of the first and second bitmaps includes comparing only portions of the first and second bitmaps corresponding to the first and second regions.

* * * * *